US010676081B2

(12) United States Patent
Tomozawa et al.

(10) Patent No.: US 10,676,081 B2
(45) Date of Patent: Jun. 9, 2020

(54) DRIVING CONTROL APPARATUS

(71) Applicant: AISIN SEIKI KABUSHIKI KAISHA, Kariya-shi, Aichi-ken (JP)

(72) Inventors: Motokatsu Tomozawa, Susono (JP); Norio Imai, Anjo (JP); Yusuke Kiyokawa, Toyota (JP); Masaya Kato, Susono (JP); Yuichi Ukai, Seto (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 147 days.

(21) Appl. No.: 15/912,665

(22) Filed: Mar. 6, 2018

(65) Prior Publication Data
US 2018/0273027 A1    Sep. 27, 2018

(30) Foreign Application Priority Data

Mar. 22, 2017  (JP) .................................. 2017-055480

(51) Int. Cl.
*B60W 30/06* (2006.01)
*B62D 15/02* (2006.01)
(Continued)

(52) U.S. Cl.
CPC ........ *B60W 30/06* (2013.01); *B60W 50/0098* (2013.01); *B60W 50/06* (2013.01); *B62D 6/005* (2013.01); *B62D 15/028* (2013.01); *B62D 15/0265* (2013.01); *B62D 15/0285* (2013.01); *G01S 15/87* (2013.01); *G01S 15/931* (2013.01);
(Continued)

(58) Field of Classification Search
CPC .................................................... B60W 30/06
See application file for complete search history.

(56) References Cited

U.S. PATENT DOCUMENTS 9,919,735 B2 *  3/2018  Tomozawa ........... B62D 15/025
10,493,985 B2 * 12/2019  Yokoyama ........... G05D 1/0223
(Continued)

FOREIGN PATENT DOCUMENTS

DE    102014213959 A1    1/2016
DE    102016211180 A1    3/2017
(Continued)

OTHER PUBLICATIONS

Communication dated Aug. 17, 2018, from the European Patent Office in counterpart European Application No. 18163343.9.

*Primary Examiner* — Bao Long T Nguyen
*Assistant Examiner* — Michael A Berns
(74) *Attorney, Agent, or Firm* — Sughrue Mion, PLLC

(57) ABSTRACT

A driving control apparatus includes: a movement control unit that controls movement of a vehicle in accordance with a first movement path indicating a movement trajectory to a first target position that is a movement destination of the vehicle; and a movement path calculating unit that calculates a second movement path as a movement path to a second target position from a position after the vehicle moves from a current position of the vehicle for a predetermined period of time along the first movement path, wherein the movement control unit controls movement of the vehicle to the second target position in accordance with the second movement path after causing the vehicle to move along the first movement path for the predetermined period of time.

11 Claims, 6 Drawing Sheets

(51) Int. Cl.
 *G01S 15/931* (2020.01)
 *B60W 50/06* (2006.01)
 *G01S 15/87* (2006.01)
 *B60W 50/00* (2006.01)
 *B62D 6/00* (2006.01)
 *G08G 1/16* (2006.01)
 *G01S 15/86* (2020.01)
 *B60W 10/20* (2006.01)

(52) U.S. Cl.
 CPC ..... *B60R 2300/806* (2013.01); *B60T 2201/10* (2013.01); *B60W 10/20* (2013.01); *B60W 2554/00* (2020.02); *G01S 15/86* (2020.01); *G01S 2015/932* (2013.01); *G01S 2015/938* (2013.01); *G08G 1/168* (2013.01)

(56) References Cited

U.S. PATENT DOCUMENTS

| | | |
|---|---|---|
| 2016/0077525 A1 | 3/2016 | Tomozawa et al. |
| 2017/0212512 A1 | 7/2017 | Schmid |
| 2018/0265130 A1* | 9/2018 | Derendarz ......... B62D 15/0285 |
| 2018/0281859 A1* | 10/2018 | Derendarz ......... B62D 15/0285 |

FOREIGN PATENT DOCUMENTS

| | | |
|---|---|---|
| JP | 04-160609 A | 6/1992 |
| JP | 2004-338635 A | 12/2004 |
| JP | 2016-060224 A | 4/2016 |

\* cited by examiner

DRIVING CONTROL APPARATUS

CROSS REFERENCE TO RELATED APPLICATIONS

This application is based on and claims priority under 35 U.S.C. § 119 to Japanese Patent Application 2017-055480, filed on Mar. 22, 2017, the entire contents of which are incorporated herein by reference.

TECHNICAL FIELD

This disclosure relates to a driving control apparatus.

BACKGROUND DISCUSSION

In the related art, a technology related to a driving control apparatus for controlling a movement of a vehicle to a target position has been proposed. The driving control apparatus creates a movement path for controlling the movement of the vehicle to the target position, and performs the movement control (e.g., including steering control) such that the vehicle moves along the movement path.

In some instances, it is difficult to continue performing the movement control according to the movement path because of detection of an obstacle or the like while the movement of the vehicle is controlled in accordance with the movement path. There has been proposed a technology that renews the movement path in this situation. See, for example, JP 2004-338635 A.

By the way, when the movement control is performed on the vehicle, a delay occurs until the movement control is actually performed after a command for the movement control is output.

However, when the movement control is performed by switching movement paths, the related art does not take into consideration the delay occurring until the movement control is actually performed after the command for the movement control is output. For this reason, a situation occurs in which it is difficult to perform the movement control according to the switched movement path.

SUMMARY

For example, a driving control apparatus according to an aspect of this disclosure includes: a movement control unit that controls movement of a vehicle in accordance with a first movement path indicating a movement trajectory to a first target position that is a movement destination of the vehicle; and a movement path calculating unit that calculates a second movement path as a movement path to a second target position from a position after the vehicle moves from a current position of the vehicle for a predetermined period of time along the first movement path. The movement control unit controls movement of the vehicle to the second target position in accordance with the second movement path after causing the vehicle to move along the first movement path for the predetermined period of time.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment disclosed here will be described. A configuration of the embodiment disclosed here, and operations, results, and effects resulting from the configuration are examples. It is possible to implement this disclosure by a configuration other than the configuration disclosed in the following embodiment, and it is possible to obtain at least one of various effects or derivative effects based on a basic configuration.

First Embodiment

In the first embodiment, a vehicle 1 equipped with a driving control apparatus (a driving control system) may be, for example, an automobile which uses an internal combustion engine (not illustrated) as a driving source, that is, an internal combustion engine automobile, or an automobile which uses an electric motor (not illustrated) as a driving source, that is, an electric automobile or a fuel cell automobile. In addition, the vehicle 1 may be a hybrid automobile which uses both of the internal combustion engine and the electric motor as driving sources, or an automobile which uses another driving source. In addition, the vehicle 1 may be equipped with various types of gear shift devices, and various types of devices, such as, systems and components, required to operate the internal combustion engine or the electric motor. In addition, it is possible to variously set the type, number, layout, and so on of devices for operating the wheels 3 of the vehicle 1.

Figure 1:
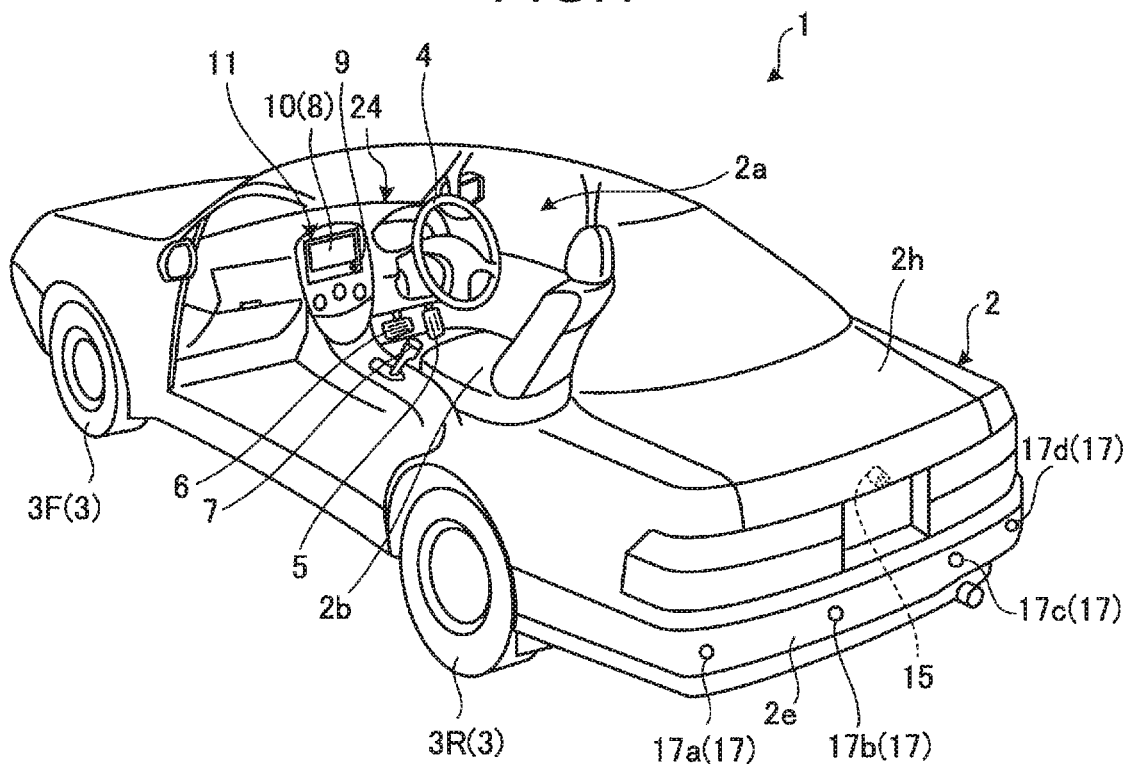
FIG. 1 is a perspective view illustrating an example in a state in which a part of the interior of a vehicle of a first embodiment is viewed in perspective.

As illustrated in FIG. 1, a vehicle body 2 forms a vehicle interior 2a which an occupant (not illustrated) gets in and out of. In the vehicle interior 2a, a steering unit 4, an acceleration operation unit 5, a braking operation unit 6, a gear shift operation unit 7, and the like are provided in the state of facing a seat 2b for a driver as an occupant. The steering unit 4 is, for example, a steering wheel which protrudes from a dashboard 24, the acceleration operation unit 5 is, for example, an accelerator pedal which is positioned under the driver's foot, the braking operation unit 6 is, for example, a brake pedal which is positioned under the driver's foot, and the gear shift operation unit 7 is, for example, a shift lever which protrudes from a center console. Further, the steering unit 4, the acceleration operation unit 5, the braking operation unit 6, the gear shift operation unit 7, and the like are not limited thereto.

In the vehicle interior 2a, there are provided a display device 8 as a display output unit and a voice output device 9 as a voice output unit. The display device 8 is, for example, a liquid crystal display (LCD), an organic electroluminescent display (OELD), or the like. The voice output device 9 is, for example, a speaker. In addition, the display device 8 is covered by a transparent operation input unit 10 such as a touch panel. The occupant can visually recognize an image displayed on a display screen of the display device 8 through the operation input unit 10. In addition, the occupant may perform operation input by touching, pushing, or moving the operation input unit 10 with a finger or the like at a position corresponding to the image displayed on the display screen of the display device 8. The display device 8, the voice output device 9, the operation input unit 10, and the like are provided on a monitor device 11 positioned, for example, at the central portion of the dashboard 24 in a vehicle width direction, that is, a left and right direction. The monitor device 11 may have an operation input unit (not illustrated) such as a switch, a dial, a joystick, or a push button. In addition, a voice output device (not illustrated) may be provided at a different position in the vehicle interior 2a from the position of the monitor device 11, and voice may be output from the voice output device 9 of the monitor device 11 and another voice output device. Further, the monitor device 11 may also serve as, for example, a navigation system or an audio system.

Figure 2:
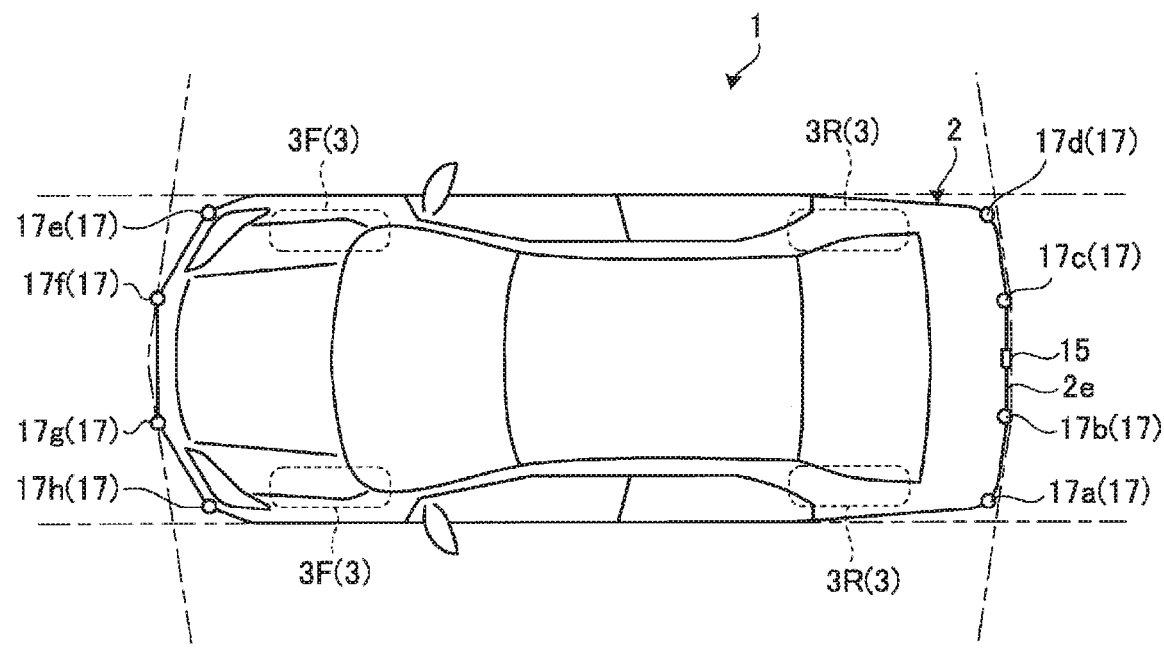
FIG. 2 is a top plan view illustrating an example of the vehicle of the first embodiment.
Figure 3:
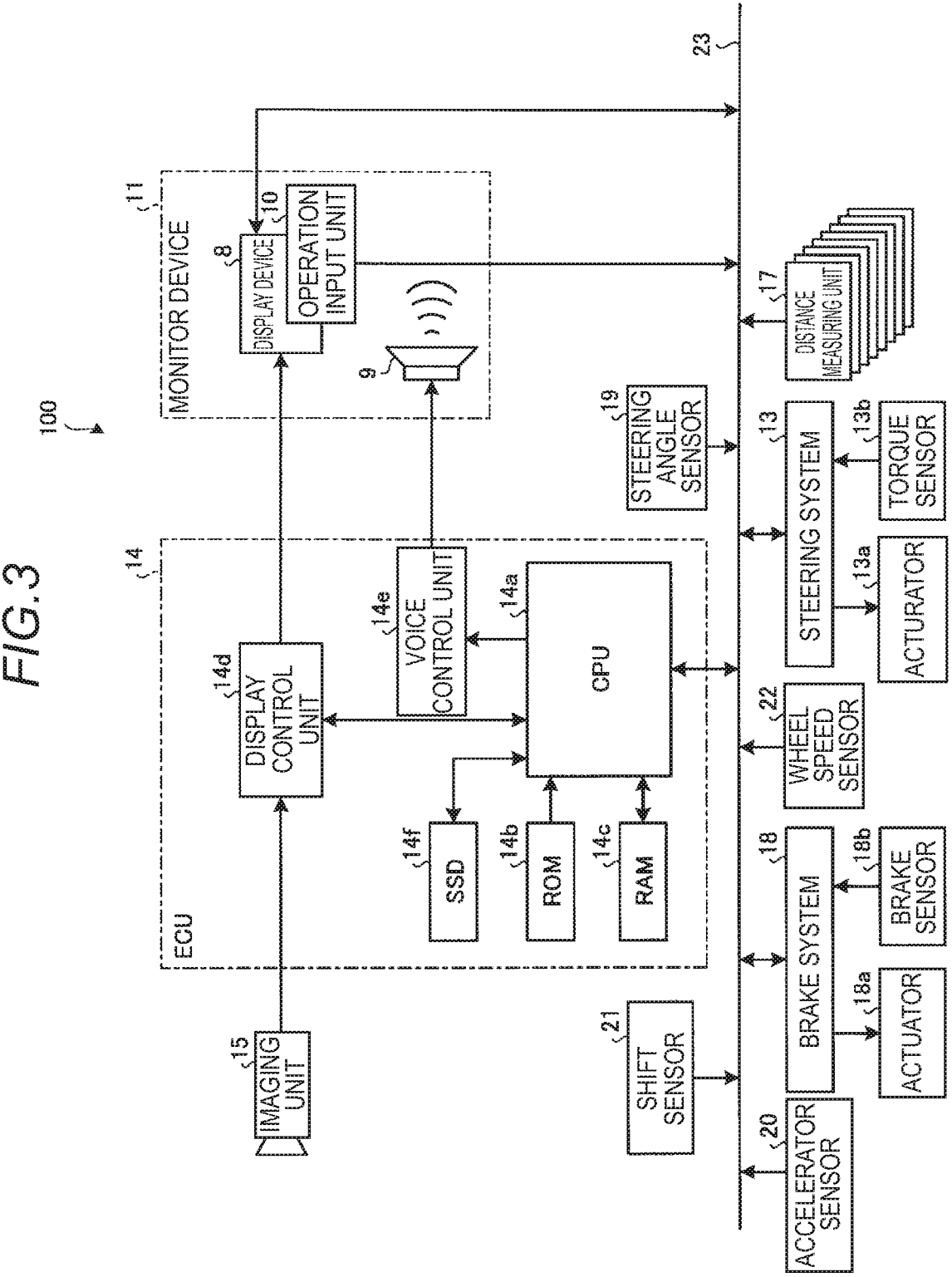
FIG. 3 is a block diagram illustrating an example of a configuration including a driving control apparatus of the first embodiment.

As illustrated in FIGS. 1 and 2, for example, the vehicle 1 is a four-wheeled vehicle, and has two left and right front wheels 3F and two left and right rear wheels 3R. All of the four wheels 3 may be configured to be turnable. As illustrated in FIG. 3, the vehicle 1 has a steering system 13 for steering at least two wheels 3. The steering system 13 has an actuator 13a and a torque sensor 13b. The steering system 13 is electrically controlled by an electronic control unit (ECU) 14 or the like and operates the actuator 13a. The steering system 13 is, for example, an electric power steering system, a steer by wire (SBW) system, or the like. The steering system 13 supplements steering force by adding torque, that is, assist torque to the steering unit 4 by the actuator 13a, or turns the wheels 3 by the actuator 13a. In this case, the actuator 13a may turn the single wheel 3 or the multiple wheels 3. In addition, the torque sensor 13b detects, for example, torque applied to the steering unit 4 by the driver.

As illustrated in FIG. 2, an imaging unit 15 is provided on the vehicle body 2. The imaging unit 15 is, for example, a digital camera incorporating an imaging element such as a charge coupled device (CCD) or a CMOS image sensor (CIS). The imaging unit 15 can output moving image data (captured image data) at a predetermined frame rate. The imaging unit 15 can have a wide-angle lens or a fisheye lens, and can capture images, for example, within a range of 140° to 220° in a horizontal direction. In addition, an optical axis of the imaging unit 15 may be set to be directed obliquely downward. Therefore, the imaging unit 15 sequentially captures images of an external environment around the vehicle 1, which includes a road surface on which the vehicle 1 can move, a region in which the vehicle 1 can be parked, and objects therearound (obstacles, people, bicycles, vehicles, etc.), and the imaging unit 15 outputs the captured images as captured image data.

For example, the imaging unit 15 is positioned at an end portion 2e on the rear side of the vehicle body 2 and provided on the lower wall portion of the door 2h of the rear trunk.

As illustrated in FIGS. 1 and 2, multiple distance measuring units 17, for example, eight distance measuring units 17a to 17h are provided on the vehicle body 2. The distance measuring unit 17 is, for example, sonar that emits ultrasonic waves and receives the reflected waves. The sonar may be called a sonar sensor, an ultrasonic detector, or an ultrasonic sonar. In addition, for example, when an obstacle (an object) approaches the vehicle 1 within a predetermined distance, the distance measuring units 17 can detect the approaching obstacle (the object) and measure the distance to the obstacle. In addition, for example, when the vehicle 1 is parked, the distance measuring units 17 may detect an adjacent vehicle or an obstacle (e.g., a curbstone, a step, a wall, and a fence) present inside a space for parking the vehicle 1, and the distance measuring units 17 may measure the distance to the obstacle.

The distance measuring units 17a and 17d disposed on both lateral sides in the rear part of the vehicle 1 serve as sensors (clearance sonar) that measure a distance between an obstacle (an adjacent vehicle) and a rear corner of the vehicle 1 when the vehicle 1 enters a parallel parking space while moving backward, or measures a distance between an obstacle (a wall or the like) and the rear corner portions after the vehicle 1 enters the parallel parking space. The ECU 14 may determine the presence and absence of an object such as an obstacle positioned at a circumference of the vehicle 1, or may measure a distance to the object, based on the detection result from the distance measuring unit 17. The obstacle is a stationary object such as a parked vehicle, a wall, a curbstone, or a street tree, or a moving object such as a traveling vehicle, a bicycle, a pedestrian, or an animal.

For example, the distance measuring units 17 may also be used to detect objects at lateral sides of the vehicle 1 in addition to objects at the front and rear sides of the vehicle 1.

As illustrated in FIG. 3, in the driving control system 100 (driving control apparatus), a brake system 18, a steering angle sensor 19, an accelerator sensor 20, a shift sensor 21, a wheel speed sensor 22, and the like are electrically connected through an in-vehicle network 23 as an electric communication line in addition to the ECU 14, the monitor device 11, the steering system 13, the distance measuring units 17, and the like. The in-vehicle network 23 is configured by, for example, a controller area network (CAN). The ECU 14 sends a control signal through the in-vehicle network 23 so as to control the steering system 13, the brake system 18, and the like. In addition, the ECU 14 may receive, through the in-vehicle network 23, detection results from the torque sensor 13b, the brake sensor 18b, the steering angle sensor 19, the distance measuring units 17, the accelerator sensor 20, the shift sensor 21, the wheel speed sensor 22, and the like, and an operation signal or the like from the operation input unit 10 or the like.

For example, the ECU 14 has a central processing unit (CPU) 14a, a read only memory (ROM) 14b, a random access memory (RAM) 14c, a display control unit 14d, a voice control unit 14e, a solid state drive (SSD) (a flash memory) 14f, and the like. The CPU 14a may perform various types of arithmetic processing and control, such as an operation of image processing for an image displayed on the display device 8, an operation of correcting brightness of the displayed image, an operation of setting a target position (a target parking position) of the vehicle 1, an operation of calculating a movement path of the vehicle 1, an operation of determining the presence or absence of interference with an object, an operation of automatically controlling the vehicle 1, and an operation of releasing the automatic control. The CPU 14a may read a program installed and stored in the nonvolatile storage device such as the ROM 14b and execute the arithmetic processing in accordance with the program. The RAM 14c temporarily stores various types of data used for the arithmetic operation in the CPU 14a. In addition, the display control unit 14d mainly executes synthesis and the like of the image data displayed on the display device 8 during the arithmetic processing in the ECU 14. In addition, the voice control unit 14e mainly processes voice data output from the voice output device 9 during the arithmetic processing in the ECU 14. In addition, the SSD 14f is a rewritable nonvolatile storage unit, and can store data even though a power source for the ECU 14 is turned off. Further, the CPU 14a, the ROM 14b, the RAM 14c, and the like may be integrated in the same package. In addition, the ECU 14 may have a configuration in which any other logical operation processor such as a digital signal processor (DSP), a logic circuit, or the like, is used instead of the CPU 14a. In addition, a hard disk drive (HDD) may be provided instead of the SSD 14f, and the SSD 14f or the HDD may be provided separately from the ECU 14.

The brake system 18 is, for example, an anti-lock brake system (ABS) which prevents the brake from locking up, a side-slip preventing device (electronic stability control (ESC)) which prevents a side slip of the vehicle 1 during cornering, an electric brake system which enhances braking force (performs brake assistance), a brake by wire (BBW), or the like. The brake system 18 provides braking force to the wheels 3 and thus to the vehicle 1 via an actuator 18a. In addition, the brake system 18 may detect the locking of the brake, idling of the wheels 3, an indication of a side slip, or the like from a difference in rotation between the left and right wheels 3, and may perform various types of control. The brake sensor 18b is, for example, a sensor which detects a position of a movable part of the braking operation unit 6. The brake sensor 18b may detect a position of the brake pedal as a movable part. The brake sensor 18b includes a displacement sensor.

The steering angle sensor 19 is, for example, a sensor which detects an amount of steering of the steering unit 4 such as the steering wheel. The steering angle sensor 19 is configured using, for example, a Hall element or the like. The ECU 14 performs various types of control by obtaining, from the steering angle sensor 19, the amount of steering of the steering unit 4 by the driver, the steering amount of each of the wheels 3 during automatic steering, and the like. Further, the steering angle sensor 19 detects a rotation angle of a rotating part included in the steering unit 4. The steering angle sensor 19 is an example of an angle sensor.

The accelerator sensor 20 is, for example, a sensor which detects a position of a movable part of the acceleration operation unit 5. The accelerator sensor 20 may detect a position of the accelerator pedal as a movable part. The accelerator sensor 20 includes a displacement sensor.

A shift sensor 21 is, for example, a sensor which detects a position of a movable part of the gear shift operation unit 7. The shift sensor 21 may detect a position of a lever, an arm, a button, or the like as a movable part. The shift sensor 21 may include a displacement sensor or may be configured as a switch.

The wheel speed sensor 22 is a sensor which detects a rotation amount of the wheel 3 or a rotational speed per unit time. The wheel speed sensor 22 outputs the number of wheel speed pulses, as a sensor value, indicating the detected rotational speed. The wheel speed sensor 22 may be configured by using, for example, a Hall element or the like. The ECU 14 calculates the amount of movement of the vehicle 1 and the like based on the sensor value obtained from the wheel speed sensor 22, and performs various types of control. Further, in some cases, the wheel speed sensor 22 is provided in the brake system 18. In such cases, the ECU 14 obtains detection results from the wheel speed sensor 22 through the brake system 18.

The configuration, the arrangement, the electric connection, or the like of the various types of sensors or actuators described above is an example and may be variously set (changed).

For the driving control according to the present embodiment, an example will be described in which the ECU 14 performs steering control that is substituted for the operations of the accelerator (acceleration operation unit 5), the brake (braking operation unit 6), the shift lever (gear shift operation unit 7), and the steering wheel (steering unit 4). However, such a control mode is non-limiting, and for example, the ECU 14 may perform the steering control, and the driver may control the accelerator, the brake, and the shift lever.

Figure 4:
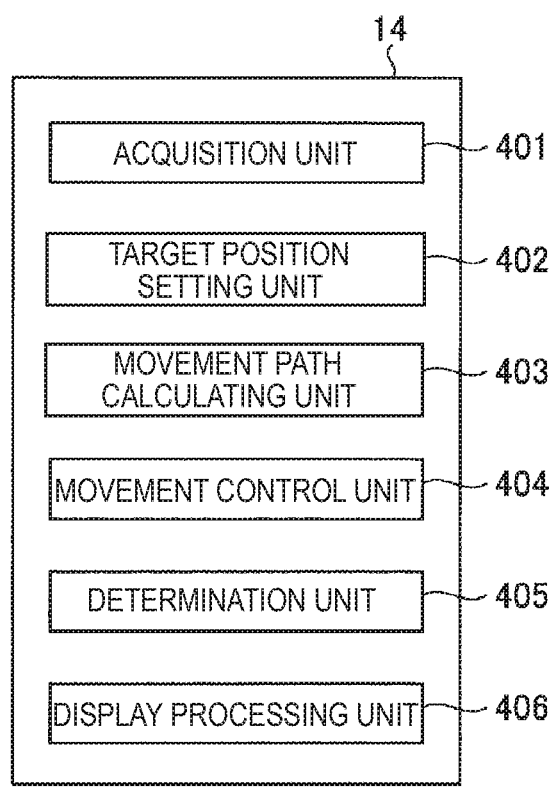
FIG. 4 is an exemplary block diagram of a configuration of an ECU of the driving control apparatus of the first embodiment.

In the present embodiment, the ECU 14 realizes at least a part of the function of the driving control apparatus in cooperation with hardware and software (a control program). FIG. 4 is an exemplary block diagram of a configuration of the ECU 14 of the driving control apparatus of the embodiment. As illustrated in FIG. 4, the ECU 14 serves as an acquisition unit 401, a target position setting unit 402, a movement path calculating unit 403, a movement control unit 404, a determination unit 405, and a display processing unit 406.

The acquisition unit 401 acquires signals transmitted from various types of sensors. For example, the acquisition unit 401 acquires the speed of the vehicle 1 based on the rotational speed transmitted from the wheel speed sensor 22.

The target position setting unit 402 sets a predetermined position, as a target parking position, which is a movement destination of the vehicle 1. The predetermined position may be specified from an empty region detected based on a signal acquired by the acquisition unit 401 from the distance measuring units 17, or for the predetermined position, a setting operation may be received from the driver.

In a case where the vehicle 1 is stopped, the movement path calculating unit 403 calculates a movement path to the target parking position from a current position of the vehicle 1. The movement path calculating unit 403 of the present embodiment may calculate a movement path including one or more turnabout positions between the current position and the target parking position.

The movement path calculating unit 403 of the present embodiment may calculate a movement path by referring to path pattern data stored in the ROM 14b, the SSD 14f, or the like. Note that the method of calculating the movement path is not limited thereto.

The movement control unit 404 controls the actuator 13a of the steering system 13 in accordance with a vehicle position such that the vehicle 1 moves along the movement path calculated by the movement path calculating unit 403. As an example, the movement control unit 404 of the present embodiment controls the movement of the vehicle 1 by outputting at least a command related to the target steering angle to the steering system 13.

The movement control unit 404 also controls acceleration and deceleration of the vehicle 1. It should be noted that the present embodiment does not intend to limit the movement control method, and for example, acceleration and deceleration may be controlled by the driver.

The determination unit 405 determines whether or not to change the target parking position of the vehicle 1. For example, the determination unit 405 of the present embodiment determines whether or not an object (e.g., an obstacle) is present in the movement path of the vehicle 1 based on a signal input from the distance measuring units 17. When the determination unit 405 determines that an object (an obstacle) is present in the movement path, the determination unit 405 determines to change the target parking position of the vehicle 1, and the target parking position is reset by the target position setting unit 402. The movement path calculating unit 403 recalculates a movement path in accordance with the reset target parking position.

In the present embodiment, a condition for determining whether or not to change the target parking position by the determination unit 405 is not limited to the presence and absence of the obstacle on a movement path 511, and for example, it may be considered whether the target parking position is corrected as a result of image recognition (re-recognition of parking frame lines and the like) by the imaging unit 15 while the vehicle 1 moves along the movement path. In the present embodiment, therefore, the determination unit 405 may determine whether or not to change the target parking position in accordance with a predetermined condition.

By the way, when the movement of the vehicle 1 is controlled, a delay occurs until an actual steering angle corresponding to the target steering angle is obtained after the ECU 14 outputs the target steering angle to the steering system 13 and then the steering system 13 controls the actuator 13a.

Therefore, the ECU 14 of the present embodiment outputs a command related to the target steering angle early by a predetermined period of time corresponding to the delay in order to realize the movement control in accordance with the movement path of the vehicle 1.

In the related art, however, the delay is not considered, and thus it is difficult to change the movement direction even though the ECU calculates the movement path from the current position to the target parking position of the vehicle and performs the movement control in accordance with the movement path while the movement of the vehicle is controlled (during the movement of the vehicle).

Figure 5:
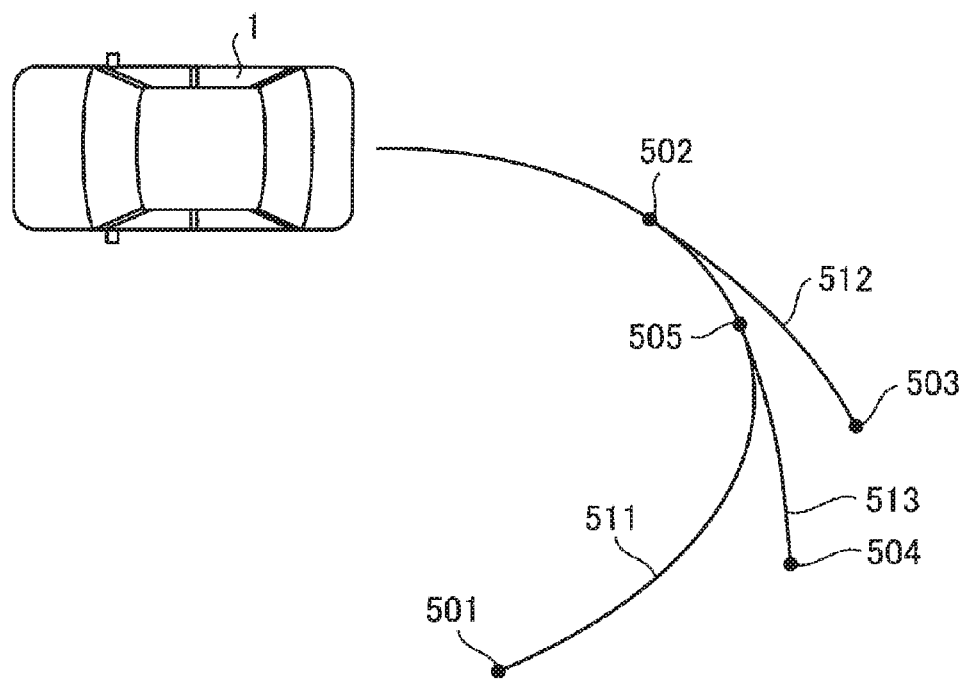
FIG. 5 is a view exemplarily illustrating a movement path of a vehicle.

FIG. 5 is a view exemplarily illustrating a movement path of the vehicle 1. FIG. 5 illustrates an example in which the movement path calculating unit 403 calculates the movement path 511 to a first target parking position 501. In the example illustrated in FIG. 5, the movement path calculating unit 403 recalculates the movement path of the vehicle 1 to a second target parking position reset by the target position setting unit 402 when the determination unit 405 determines to change the target parking position, which is a movement destination of the vehicle 1 (from the first target parking position to the second target parking position), more specifically, when the determination unit 405 determines that an obstacle is present on the movement path 511 from a detection result from the distance measuring unit 17.

In the example illustrated in FIG. 5, the movement path is recalculated at a time point $T_1$ (current time) when the vehicle 1 is present at a position 502. Note that the second target parking position after the change is omitted because it may be any region in which no obstacle or the like is present.

A movement path 512 is a movement path calculated by the method of recalculating the movement path in the related art, that is, a movement path that is set from the current (i.e., the time point at which the target parking position is reset and the movement path is recalculated) position 502 as a start position, switched at a turnabout position 503, and then guided to a target parking position (not illustrated). In the movement path 512, it is necessary to immediately change the movement direction of the vehicle 1 from the position 502 at present, that is, at a time point when the movement path is recalculated. However, the target steering angle for performing the movement control in accordance with the movement path is output early in consideration of the delay.

Figure 6:
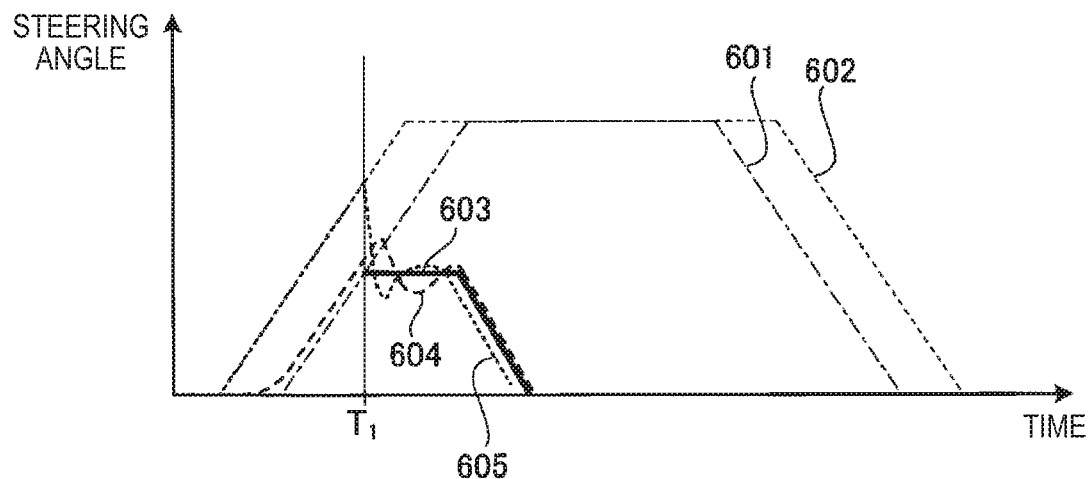
FIG. 6 is a view exemplarily illustrating a corresponding relationship between a target steering angle and an actual steering angle in the related art.

FIG. 6 is a view exemplarily illustrating a corresponding relationship between a target steering angle and an actual steering angle in the related art. In an example illustrated in FIG. 6, a first target steering angle 601 shows changes in target steering angle output to perform movement control in accordance with the movement path 511 in FIG. 5. A first actual steering angle 602 shows changes in actual steering angle of the vehicle, which result from the control by the steering system 13 in accordance with the target steering angle showed as the first target steering angle 601. The time point $T_1$ indicates a time point when the vehicle reaches the position 502 illustrated in FIG. 5. The movement path is recalculated at the time point $T_1$.

A second actual steering angle 603 shows changes in actual steering angle required to perform the movement control in accordance with the movement path 512 calculated by the recalculation method in the related art. The second actual steering angle 603 indicates an operation of returning the steering angle to "0" after the steering is held for a predetermined period of time.

Meanwhile, an output target steering angle 604 indicates a command related to the target steering angle actually output by the ECU. As indicated by the output target steering angle 604, a command related to the target steering angle greater than the steering angle indicated by the second actual steering angle 603 is output at the time point $T_1$.

Therefore, the ECU needs to output a command related to a target steering angle smaller than the second actual steering angle 603 in order to follow the second actual steering angle 603. As a result, the output target steering angle 604 is repeatedly increased and decreased.

An output actual steering angle 605 shows changes in actual steering angle of the vehicle, which result from the control by the steering system 13 in accordance with the output target steering angle 604. The output target steering angle 604 rapidly increases and decreases, and as a result, the output actual steering angle 605 also rapidly increases and decreases.

For this reason, a gap occurs between the output actual steering angle 605 and the second actual steering angle 603, and the output actual steering angle 605 rapidly changes, so that the occupant seated in the vehicle is likely to feel discomfort.

Therefore, when recalculating the movement path, the movement path calculating unit 403 of the present embodiment recalculates a movement path to the reset target parking position from a position after the vehicle 1 moves from the current position of the vehicle 1 for a predetermined period of time along the already calculated movement path. In the present embodiment, the predetermined period of time is a period of time until the movement control is performed in accordance with the target steering angle after the command related to the target steering angle is output.

In the example illustrated in FIG. 5, when the vehicle 1 is present at the position 502, the movement path calculating unit 403 recalculates a movement path 513 to the second target parking position from a position 505 after travel along the movement path 511 for a predetermined period of time. The movement path 513 follows the already calculated movement path from the current position 502 to the position 505, and then follows a movement path that allows turning at a turnabout position 504 in order for the vehicle 1 to move from the position 505 to the reset second target parking position (not illustrated). Note that the movement path which reaches the second target parking position after switched at the turnabout position 504 may be any movement path, and thus, a description thereof will be omitted.

Figure 7:
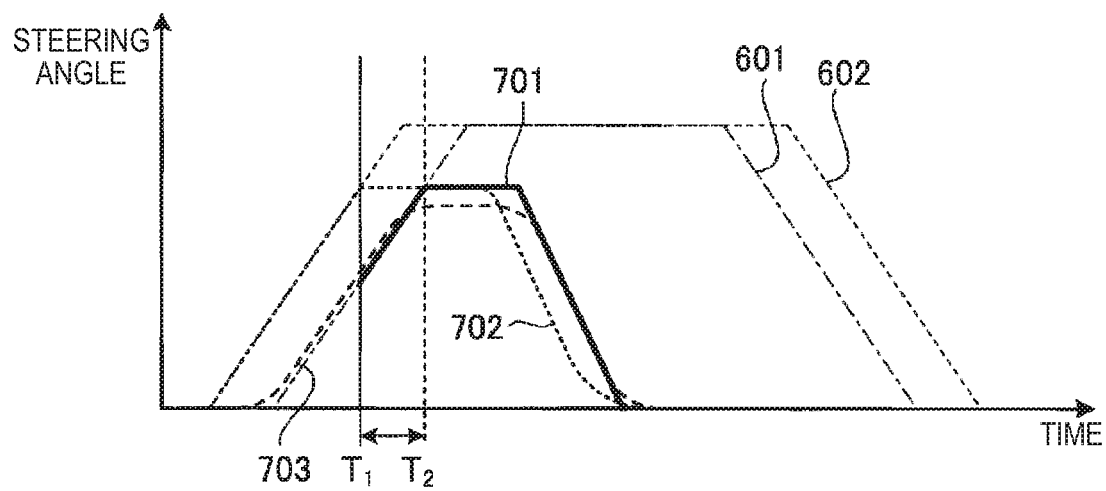
FIG. 7 is a view exemplarily illustrating a corresponding relationship between a target steering angle and an actual steering angle in the first embodiment.

FIG. 7 is a view exemplarily illustrating a corresponding relationship between a target steering angle and an actual steering angle. The first target steering angle 601 and the first actual steering angle 602 are the same as those illustrated in FIG. 6.

In the example illustrated in FIG. 7, the movement path is recalculated at the time point $T_1$ when the vehicle 1 is present at the position 502. When recalculating the movement path at the time point $T_1$, the movement path calculating unit 403 of the present embodiment recalculates the movement path to the target parking position from a position at which the vehicle 1 is present at a time point $T_2$ after a predetermined period of time has elapsed.

A second actual steering angle 701 shows changes in actual steering angle required to perform the movement control in accordance with the movement path 513 recalculated by the movement path calculating unit 403. The second actual steering angle 701 indicates a steering operation of returning the steering angle to "0" after the steering is held for a predetermined period of time from the time point $T_2$.

Meanwhile, an output target steering angle 702 indicates a command related to the target steering angle actually output by the ECU 14. As indicated by the output target steering angle 702, a target steering angle equal to the second actual steering angle 701 at the time point $T_2$ is output at the time point $T_1$. There is indicated a command for the steering that returns the steering angle to "0" after the steering is held for a predetermined period of time from the time point $T_1$ (the time point earlier by the delay from the time point $T_2$) such that the output target steering angle 702 follows the second actual steering angle 701.

An output actual steering angle 703 shows changes in actual steering angle of the vehicle 1, which result from the control by the steering system 13 in accordance with the output target steering angle 702. As indicated by the output actual steering angle 703, agreement with the second actual steering angle 701 can be achieved when the steering control is performed in accordance with the output target steering angle 702 obtained by taking the delay into consideration. In the example illustrated in FIG. 7, the output actual steering angle 703 does not rapidly change unlike the output actual steering angle 605 in FIG. 6. Thus, it is possible to prevent the occupant seated in the vehicle 1 from feeling discomfort.

In the present embodiment, the predetermined period of time until the movement control is performed after the command related to the target steering angle is output is not a constant period of time, but varies depending on a speed of the vehicle 1. Therefore, the movement path calculating unit 403 of the present embodiment sets the predetermined period of time based on the speed of the vehicle 1 acquired by the acquisition unit 401. Further, the movement path calculating unit 403 recalculates the movement path to the target parking position from a position advanced for the predetermined period of time (set based on the speed) along the already calculated movement path. Further, for example, it may be considered that the predetermined period of time increases as the speed of the vehicle 1 increases.

The movement control unit 404 controls the movement of the vehicle 1 in accordance with the command related to the target steering angle.

Thus, the movement control unit 404 controls the movement of the vehicle 1 in accordance with the already calculated movement path until the movement path is recalculated by the movement path calculating unit 403.

After the movement path is recalculated by the movement path calculating unit 403, the movement control unit 404 begins to perform the movement control in accordance with the target steering angle corresponding to the recalculated movement path. As a result, the movement control unit 404 controls the movement of the vehicle 1 in accordance with the recalculated movement path from a position after the vehicle 1 moves from the current position for the predetermined period of time along the movement path before the recalculation.

The display processing unit 406 displays various information on the display device 8. For example, the display processing unit 406 displays information about the control of movement of the vehicle 1, which is performed by the movement control unit 404. Further, when an obstacle is detected by the determination unit 405, the display processing unit 406 may perform the display or the like of the situation in which the obstacle is detected.

Figure 8:
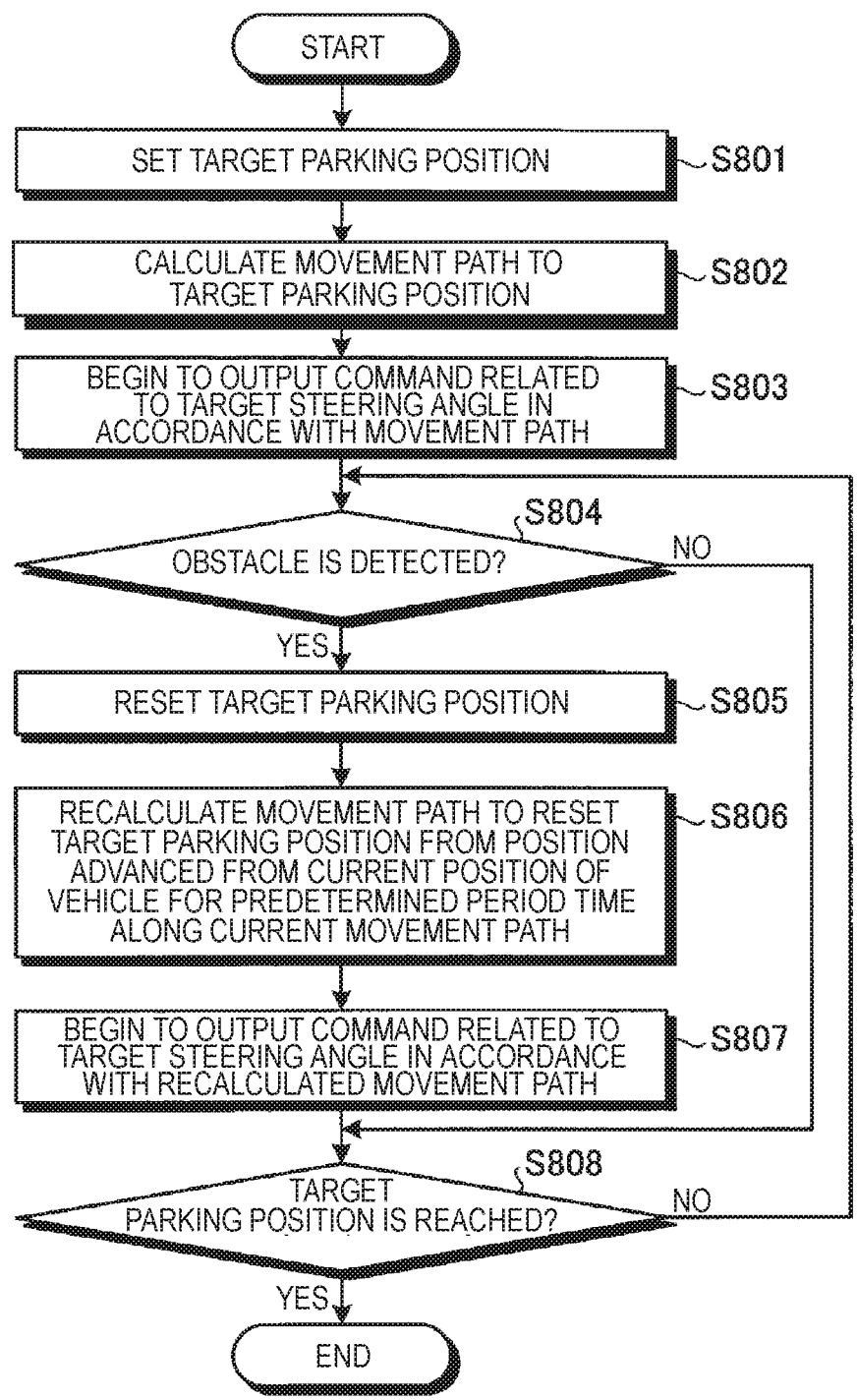
FIG. 8 is a flowchart illustrating a procedure of vehicle movement control by the ECU of the first embodiment.

Next, the control of movement of the vehicle 1 performed by the ECU 14 of the present embodiment will be described. FIG. 8 is a flowchart illustrating a procedure of the aforementioned processing performed by the ECU 14 of the present embodiment.

First, the target position setting unit 402 sets the target parking position of the vehicle 1 (S801).

Next, the movement path calculating unit 403 calculates the movement path to the target parking position (S802).

The movement control unit 404 takes into consideration a delay caused by the movement control, and then begins to output a command related to the target steering angle in accordance with the movement path to the steering system 13 (S803).

The determination unit 405 determines whether or not an obstacle is present on the movement path based on the result of detection by the distance measuring units 17, which is acquired by the acquisition unit 401 (S804). When the determination unit 405 determines that no obstacle is present (S804: No), the process proceeds to S808.

Meanwhile, when the determination unit 405 determines that an obstacle is present on the movement path (S804: Yes), the target position setting unit 402 takes the obstacle into consideration, and then resets the target parking position of the vehicle 1 (S805).

Next, the movement path calculating unit 403 recalculates the movement path to the reset target parking position from a position advanced from the current position of the vehicle for a predetermined period of time in accordance with a current movement path (the movement path before the recalculation) (S806).

Thereafter, the movement control unit 404 begins to output a command related to the target steering angle in accordance with the recalculated movement path (S807). The command related to the target steering angle is output early by a time corresponding to the delay caused by the movement control. In other words, the command related to the target steering angle output in S807 corresponds to the movement control from a position advanced for a predetermined period of time.

Thereafter, the movement control unit 404 determines whether or not the vehicle reaches the target parking position (S808). When it is determined that the vehicle does not reach the target parking position (S808: No), the process is performed again from S804.

Meanwhile, when it is determined that the vehicle reaches the target parking position (S808: Yes), the movement control unit 404 ends the process.

In the present embodiment described above, the ECU 14 performs the movement control to the target parking position. However, in the present embodiment, the movement destination of the vehicle 1 is not limited to the target parking position, and may be any target position for the vehicle 1. For example, the above-described movement control may be performed in a case where the target position is a movement destination set when the vehicle leaves the parking position.

Incidentally, in the control of movement of the vehicle, inertia occurs when a turning direction is changed, for example, when the vehicle stops turning while turning or when the vehicle begins to turn from a state in which the vehicle stops turning. For this situation, it is effective that the target steering angle is output first. In the present embodiment, the above-described movement control can be performed even in a case where the turning direction is changed, so that it is possible to change the turning direction in consideration of the inertia.

In the present embodiment, by performing the above-described movement control, it is possible to control the movement in accordance with the movement path and to prevent wobble of the vehicle 1 even in a case where the movement path is changed. As a result, it is possible to prevent discomfort of the occupant and to improve ride quality.

For example, a driving control apparatus according to an aspect of this disclosure includes: a movement control unit that controls movement of a vehicle in accordance with a first movement path indicating a movement trajectory to a first target position that is a movement destination of the vehicle; and a movement path calculating unit that calculates a second movement path as a movement path to a second target position from a position after the vehicle moves from a current position of the vehicle for a predetermined period of time along the first movement path. The movement control unit controls movement of the vehicle to the second target position in accordance with the second movement path after causing the vehicle to move along the first movement path for the predetermined period of time. According to this configuration, for example, even if the movement path is changed, it is possible to realize the movement control in accordance with the changed movement path.

In the driving control apparatus according to the aspect of this disclosure, for example, the movement control unit may further perform movement control using, as the predetermined period of time, a period of time until the movement control is performed in accordance with a target steering angle after a command related to the target steering angle of the vehicle is output. According to this configuration, for example, since a delay occurring until the movement control is performed after the command related to the target steering angle is output is taken into consideration, it is possible to realize the movement control in accordance with the changed movement path.

For example, the driving control apparatus according to the aspect of this disclosure may further include an acquisition unit that acquires a speed of the vehicle, and the movement path calculating unit sets the predetermined period of time based on the speed of the vehicle. According to this configuration, for example, since the speed of the vehicle is taken into consideration, it is possible to realize the movement control in accordance with the changed movement path.

In the driving control apparatus according to the aspect of this disclosure, for example, the movement path calculating unit may calculate the second movement path when the movement destination of the vehicle is changed from the first target position to the second target position. According to this configuration, for example, even if the movement path is changed by an obstacle, it is possible to realize the movement control in accordance with the changed movement path.

For example, the driving control apparatus according to the aspect of this disclosure may further include a determination unit that determines whether or not to change the target position of the vehicle, in which when it is determined that an obstacle is present on the first movement path, the determination unit determines to change the movement destination of the vehicle from the first target position to the second target position.

In the driving control apparatus according to the aspect of this disclosure, for example, the second target position may be a region in which no obstacle is present.

Although the embodiments disclosed here have been described, the embodiments are presented by way of example and are not intended to limit the scope of this disclosure. These novel embodiments may be implemented in various other forms, and various omissions, substitutions, and changes may be made without departing from the gist of this disclosure. These embodiments and modifications are included in the scope or gist of this disclosure, and are included in the equivalent scope of the disclosure described in the claims.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A driving control apparatus comprising:
a movement control unit that controls movement of a vehicle in accordance with a first movement path indicating a movement trajectory to a first target position that is a movement destination of the vehicle; and
a movement path calculating unit that calculates a second movement path as a movement path to a second target position from a position after the vehicle moves from a current position of the vehicle for a predetermined period of time along the first movement path,
wherein the movement control unit controls movement of the vehicle to the second target position in accordance with the second movement path after causing the vehicle to move along the first movement path for the predetermined period of time, and
the predetermined period of time is a period of time until the movement control is performed in accordance with a target steering angle after a command related to the target steering angle of the vehicle is output.

2. The driving control apparatus according to claim 1, further comprising:
an acquisition unit that acquires a speed of the vehicle,
wherein the movement path calculating unit sets the predetermined period of time based on the speed of the vehicle.

3. The driving control apparatus according to claim 2, wherein the movement path calculating unit calculates the second movement path when the movement destination of the vehicle is changed from the first target position to the second target position.

4. The driving control apparatus according to claim 3, further comprising:
a determination unit that determines whether or not to change the target position of the vehicle,
wherein, when it is determined that an obstacle is present on the first movement path, the determination unit determines to change the movement destination of the vehicle from the first target position to the second target position.

5. The driving control apparatus according to claim 2, further comprising:
a determination unit that determines whether or not to change the target position of the vehicle,
wherein, when it is determined that an obstacle is present on the first movement path, the determination unit determines to change the movement destination of the vehicle from the first target position to the second target position.

6. The driving control apparatus according to claim 5, wherein the second target position is a region in which no obstacle is present.

7. The driving control apparatus according to claim 1, wherein the movement path calculating unit calculates the second movement path when the movement destination of the vehicle is changed from the first target position to the second target position.

8. The driving control apparatus according to claim 7, further comprising:
a determination unit that determines whether or not to change the target position of the vehicle,
wherein, when it is determined that an obstacle is present on the first movement path, the determination unit determines to change the movement destination of the vehicle from the first target position to the second target position.

9. The driving control apparatus according to claim 8, wherein the second target position is a region in which no obstacle is present.

10. The driving control apparatus according to claim 1, further comprising:
a determination unit that determines whether or not to change the target position of the vehicle,
wherein, when it is determined that an obstacle is present on the first movement path, the determination unit determines to change the movement destination of the vehicle from the first target position to the second target position.

11. The driving control apparatus according to claim 10, wherein the second target position is a region in which no obstacle is present.

* * * * *